United States Patent [19]

Rearick

[11] Patent Number: 4,679,164

[45] Date of Patent: Jul. 7, 1987

[54] DIGITAL HIGH SPEED PROGRAMMABLE CONVOLVER

[75] Inventor: Thomas C. Rearick, Roswell, Ga.

[73] Assignee: The United States of America as represented by the Secretary of the Army, Washington, D.C.

[21] Appl. No.: 682,126

[22] Filed: Dec. 17, 1984

[51] Int. Cl.$^4$ .................. G06F 15/336; G06F 7/52
[52] U.S. Cl. ................................ 364/728; 364/754
[58] Field of Search ............ 364/728, 748, 754, 759, 364/736, 768

[56] References Cited

FOREIGN PATENT DOCUMENTS 0137386  4/1985  European Pat. Off. .

OTHER PUBLICATIONS

A. Peled et al, IEEE Trans. Acoustics, Speech & Signal Processing, vol. ASSP-22, No. 6, Dec. 1974, entitled "A New Hardware Realization of Digital Filters".
C. S. Burrus, IEEE Trans. on Circuits and Systems, vol. CAS-24, No. 12, Dec. 1977, entitled "Digital Filter Structures Described by Distributed Arithmetic".
H. J. De Man et al, IEEE Journal of Solid-State Circuits, vol. SC—13, No. 5, Oct. 1978, entitled "High-Speed NMOS Circuits for ROM-Accumulator and Multiplier Type Digital Filters".
Allen, "Computer Architecture for Signal Processing", Apr. 1975, Proceedings of the IEEE, pp. 624–633.
Freeny, "Special-Purpose Hardware for Digital Filtering", Proceeding of the IEEE, Apr. 1975, pp. 633–643.
Hampel et al, "CMOS/SOS Serial-Parallel Multiplier", IEEE Journal of Solid-State Circuits, Oct. 1975, pp. 307–313.
Verjans, "A Serial-Parallel Multiplier Using the NENDEP Technology", IEEE Journal of Solid-State Circuits, Jun. 1977, pp. 323–325.
Danielsson, "Serial/Parallel Convolvers", IEEE Trans. on Computers, Jul. 1984, pp. 652–667.

Primary Examiner—Archie E. Williams, Jr.
Assistant Examiner—Tan V. Mai
Attorney, Agent, or Firm—Sheldon Kanars; Jeremiah G. Murray; John T. Rehberg

[57] ABSTRACT

A circuit module rapidly calculates a discrete numerical convolution. A convolution such as finding the sum of the products of a 16 bit constant and a 16 bit variable is performed by the module which is programmable so that the constant may be changed for a new problem. In addition, the module may be programmed to find the sum of the products of 4 and 8 bit constants and variables. Random access memories are loaded with partial products of the selected constant and all possible variables. Then, when the actual variable is loaded, it acts as an address to find the correct parital product in the particular RAM. The partial products from all of the RAMs are shifted to the appropriate numerical power position (if necessary) and then added in adder elements.

4 Claims, 2 Drawing Figures

DIGITAL HIGH SPEED PROGRAMMABLE CONVOLVER

The Government has rights in this invention pursuant to Contract No. DAAK20-80-C-0255 awarded by the Department of the Army.

BACKGROUND OF THE INVENTION

1. Field of the Invention

This invention relates generally to digital processing, and more particularly to a device for rapidly calculating a discrete numerical convolution.

2. Description of the Prior Art

In the past a distributed arithmetic and read only memory (ROM)-accumulator approach has been suggested for the calculation of the product of a variable factor and a constant factor. In that approach, a table of predetermined partial products is stored, typically in ROMs.

Such an approach lacked flexibility because of the ROM's inability to permit changing or substitution of the constant.

An article by Peled et al, entitled "A New Hardware Realization of Digital Filters", in IEEE Transactions on Acoustics, Speech, and Signal Processing, Vol. ASSP-22, No. 6, 1974, describes an approach using distributed arithmetic in a digital filter.

An article by Burrus, entitled "Digital Filter Structures Described by Distributed Arithmetic", in IEEE Transactions on Circuits and Systems, Vol. CAS-24, No. 12, 1977, discloses generally the convolution and distributed arithmetic approach to multiplication.

An article by De Man et al, entitled "High-Speed NMOS Circuits for ROM-Accumulator and Multiplier Type Digital Filters", in the IEEE Journal of Solid-State Circuits, Vol. SC-13, No. 5, Oct. 1978, explores circuit techniques which can lead to full integration of digital filter structures.

The present invention, in addition to providing flexibility in reprogramming the constant multiflier, permits a modular approach to multiplication. Any number of the disclosed modules may be coupled to provide either multiplication of longer bit streams or simultaneous multiplication of a variety of products.

SUMMARY OF THE INVENTION

A single module having the capacity to provide the product of a 16 bit constant factor and a 16 bit variable factor is described. The module achieves flexibility by permitting any 16 bit constant to be utilized since random access memory (RAM) modules are employed. A RAM and configuration programmer loads four additional RAMs—each with the sixteen possible solutions which result from multiplying the constant by all possible 4 bit numbers. A 4 bit register associated with each RAM is then loaded with the actual factor by which the constant is to be multiplied. The registers are in series, so that a 16 bit variable factor can be loaded—4 bits in each register. For 16 bit factors, the product derived for the first 4 bits of the variable (least significant) does not have to be shifted; however, the second 4 bit result must be shifted four places, the third 4 bit result shifted eight places and the fourth 4 bit result shifted twelve places. After shifting, the shifted partial products are added to produce the final result.

The same module can be configured to deal with two pairs of 8 bit factors and four pairs of a 4 bit factors merely by appropriate programming.

DESCRIPTION OF THE PREFERRED EMBODIMENT

The present invention is a circuit module for rapidly performing the convolution of one pair of 16 bit factors, two pairs of 8 bit factors or four pairs of 4 bit factors. In each case, half of the pair are constant factors and the other half variable factors. The module stores partial products in a volatile memory so that "constant" multiplier partial products may be modified. That is, new constants can be used in the module when desired. In addition, the unique segmentation of memory in the parallel-pipeline architecture of this device enables functional reconfiguration using external programming which may be performed by a microprocessor. The design may be implemented in a module which can be fabricated readily on a single chip using 5-mil line width or less CMOS/SOS technology; however, it can be expanded in two dimensions utilizing a plurality of such chips so as to create a convolution function of unlimited word length (in multiples of 4 bits) or else an unlimited number of products. The single chip device may be configured to divide the variable factor into 4 bit units (in the case of 16 and 8 bit factors). When so reconfigured, shift registers are also enabled to perform necessary shifts in the partial products. (As in decimal multiplication, there is a need to keep each digit in its proper power column when summing the partial products.)

Explanation of the drawings will be facilitated by first examining the distributed arithmetic algorithm by using the multiplication of two sixteen bit factors as an example. In this example, a sixteen bit constant factor, A, will be multiplied by a sixteen bit variable factor, b.

The two factors may be expressed by:

$$A = \sum_{i=0}^{15} A_i \cdot 2^i$$

and $$b = \sum_{i=0}^{15} b_i \cdot 2^i$$

where $A_i$ and $b_i$ are 1 bit coefficients. The product of A and b may be expressed by:

$$Ab = A \left[ \sum_{j=0}^{15} b_j \cdot 2^j \right]$$

or expanding:

$$Ab = A \left[ \sum_{j=0}^{3} b_j \cdot 2^j + \sum_{j=4}^{7} b_j \cdot 2^j + \sum_{j=8}^{11} b_j \cdot 2^j + \sum_{j=12}^{15} b_j \cdot 2^j \right].$$

We may now change the indices of the summations to get:

$$Ab = A\left[\sum_{j=0}^{3} b_j \cdot 2^j + 2^4 \sum_{j=0}^{3} b_{j+4} \cdot 2^j + 2^8 \sum_{j=0}^{3} b_{j+8} \cdot 2^j + 2^{12} \sum_{j=0}^{3} b_{j+12} \cdot 2^j\right]$$

or $$Ab = \left[A \sum_{j=0}^{3} b_j \cdot 2^j\right] + 16\left[A \sum_{j=0}^{3} b_{j+4} \cdot 2^j\right] + 256\left[A \sum_{j=0}^{3} b_{j+8} \cdot 2^j\right] + 4096\left[A \sum_{j=0}^{3} b_{j+12} \cdot 2^j\right].$$

Figure 1:
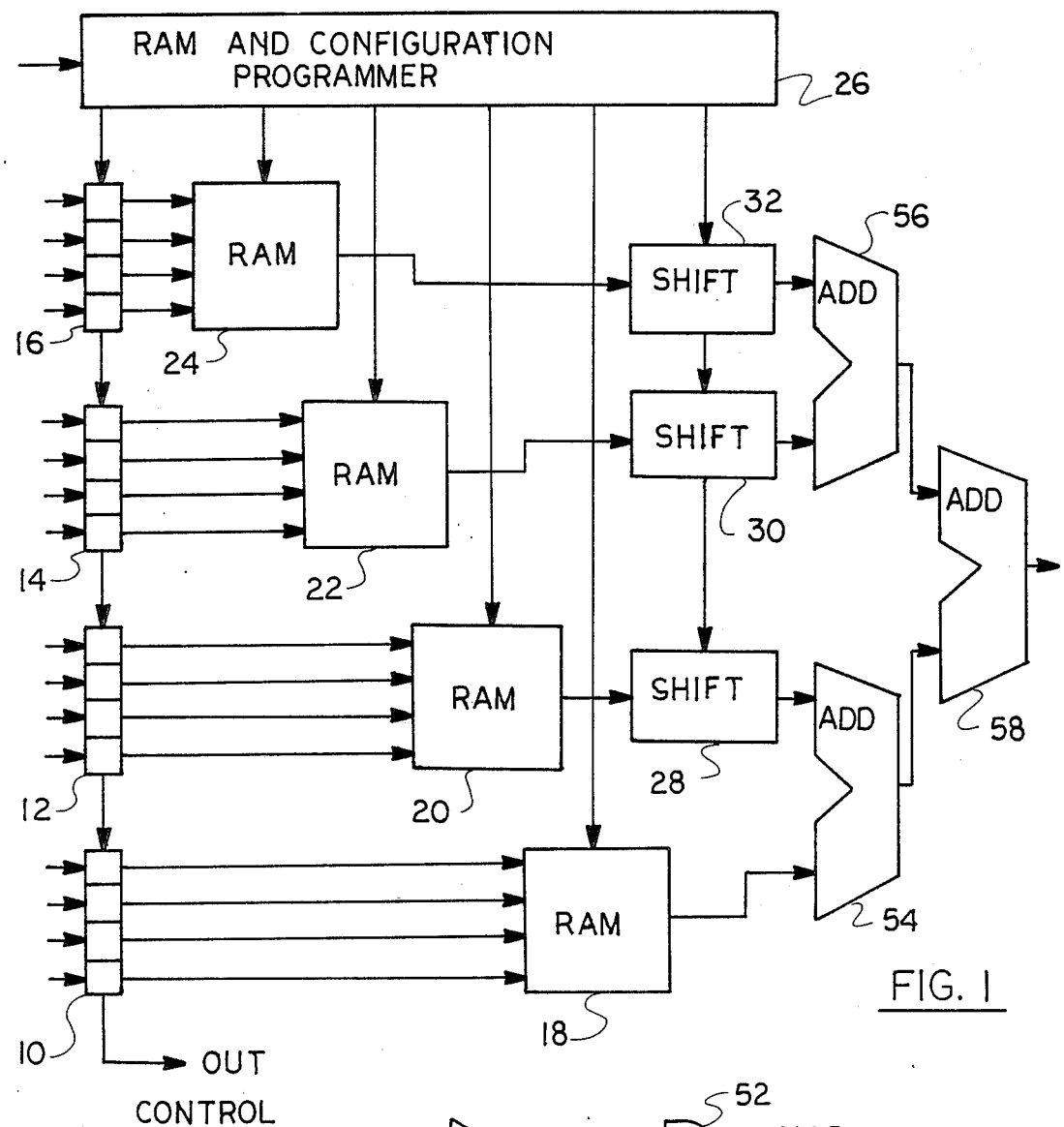
FIG. 1 is a block diagram of the overall module arrangement.

Referring now to FIG. 1, four 4 bit registers 10–16 are provided to receive the 16 bits of the variable term b, with register 10 receiving the least significant bits. Four random access memories (RAMs) 18–24 are also provided, each one containing the 16 partial products which result when the 16 bit constant factor is multiplied by all possible 4 bit factors. Each RAM has a capacity of 320 bits, and also receives as an input the four bits from its associated register. This input is the actual variable factor unit in the problem being performed.

Referring back to the arithmetic example given, in the last equation the quantity in the brackets is seen in each case to contain the constant and four additional four bit terms to be multiplied by the constant. These four additional terms are the partial products provided by programmer 26. There are only 16 unique solutions of 20 bits each for each bracketed quantity. A RAM memory of 320 bits (16×20) is sufficient to store all possible partial products solutions for each bracketed term.

Referring again to the last equation, the partial products are multiplied by powers of two. This is accomplished using shift registers 28–32.

Figure 2:
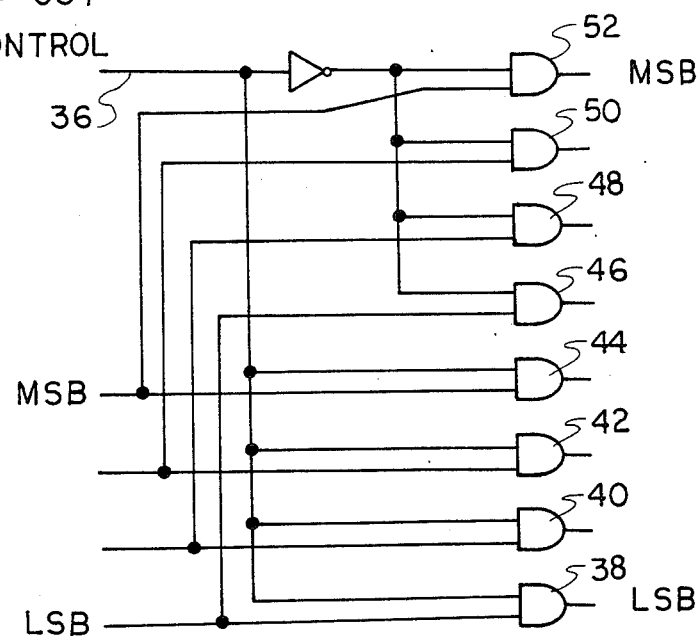
FIG. 2 is a block diagram of a single shift register.

Turning now to FIG. 2, shift register 28 of FIG. 1 is shown in more detail. (The shift register is illustrated as having gates for only four bits for ease of depiction.) A control signal is applied to terminal 36 which will be a "0" to shift 4 or a "1" to direct no shift. Thus a "1" applied to terminal 36 will cause gates 38–44 to be open permitting the four bit input to pass through unchanged. A "0" applied to terminal 36 will cause the four bit input to be passed through gates 46–52, while zero outputs will appear at the outputs of gates 38–44. The four place shift in the binary system is, of course, equivalent to multiplying by 16 in the decimal system.

Shift registers 30 and 32 are similar to shift register 28; however, shift register 30 will shift its input zero or eight places (equivalent to decimal multiplication by 256) and shift register 32 will shift its input zero or twelve places (equivalent to decimal multiplication by 4096).

Returning to FIG. 1, the output of RAM 18 is added to the output of shift register 28 in adder 54. Similarly, the output of shift register 32 is added to the output of shift register 30 in adder 56. Finally, the outputs of adders 54 and 56 are added in adder 58 to complete the convolution.

In operation, programmer 26 is first provided with the constant or constants which will be used in the convolution. These are multiplied by a series of potential factors, typically $2^0$ through $2^3$. The products of these multiplications are provided to RAMs 18–24. If a 16 bit constant is involved, all RAMs will receive the same potential products. On the other hand, if the constants and variables are both 4 bits, each RAM will receive all the products of one 4 bit constant multiplied by all potential variables ($2^0$ through $2^3$).

The apparatus described above may also be used to perform a sliding convolution. In this case, each time a new digit is introduced in the top position in register 16, a digit drops out of the bottom of register 10. With each new digit introduced, a multiplication occurs for the number then contained in the registers.

Although a single embodiment of a digital high speed programmable convolver has been illustrated and described, it will be apparent that changes and modifications can be made without departing from the spirit of the invention or the scope of the appended claims.

I claim:

1. A digital high speed programmable convolver module comprising:
   a plurality of random access memory modules;
   register means associated with each of said random access memory modules;
   programming means for receiving initially, one or more constant factors and providing to said random access memory modules products of said factors with a series of potential factors;
   said programming means receiving secondarily, selected ones of said potential factors and providing said selected ones to said register means, whereby when the selected potential factor provided to a particular register is fed to its associated random access memory module the corresponding product will be released; and
   adding means for summing the products released from said random access memory modules.

2. A digital high speed programmable convolver module in accordance with claim 1 further including: shifting means associated with certain of said random access memory modules for positioning each of the digits of the released product in its proper power position.

3. A digital high speed programmable convolver module comprising:
   a plurality of digital random access memory modules;
   each of said random access memory modules having a 320 bit capacity;
   a digital register associated with each of said random access memory modules;
   programming means;
   said programming means providing to each random access memory module all products of a constant factor multiplied by all combinations of N bits;
   each of said registers having a capacity of N bits;
   said programming means providing to each register N bits of a variable factor;
   a shift register associated with each of said random access memory modules except one;
   said programming means providing to each of said shift registers directions of the number of spaces its input is to be shifted;
   each of said random access memory modules delivering to its associated shift register the product identified by the N bits of its associated register;
   an adder associated with each pair of shift registers and the remaining shift register and digital random access memory module; and an adder associated with each pair of adders.

4. A digital high speed programmable convolver module comprising:
- first, second, third and fourth digital random access memory modules;
- each of said random access memory modules having a 320 bit capacity;
- a 4 bit digital register associated with each of said random access memory modules;
- each of said 4 bit digital registers addressing its associated random access memory module with a 4 bit factor unit;
- programming means;
- said programming means providing to each random access memory module sixteen products of a constant factor and a 4 bit variable factor unit;
- a shift register associated with each of the second, third and fourth random access memory modules and receiving the outputs therefrom;
- a first adder connected to receive and sum the outputs of said first random access memory module and the shift register associated with the second random access memory module;
- a second adder connected to receive and sum the outputs of the shift registers associated with the third and fourth random access memory modules; and
- a third adder connected to receive and sum the outputs of said first and second adders.

* * * * *